United States Patent

Huang et al.

Patent Number: 5,867,059
Date of Patent: Feb. 2, 1999

[54] DEMODULATING SYSTEM FOR MSK AND GMSK SIGNAL USING A FAST FOURIER TRANSFORM CONVERTER

[75] Inventors: Chia-Chi Huang, Hsinchu; Yung-Liang Huang, Hsinchu Hsien; Kon-Da Fan, Taipei, all of Taiwan

[73] Assignee: National Science Council, Taipei, Taiwan

[21] Appl. No.: 493,503

[22] Filed: Jun. 22, 1995

[51] Int. Cl.⁶ .................................................. H04L 27/14

[52] U.S. Cl. .......................... 329/302; 375/326; 375/336

[58] Field of Search ................................... 329/300, 301, 329/302, 303; 375/324, 326, 336

[56] References Cited

U.S. PATENT DOCUMENTS

| | | | |
|---|---|---|---|
| 4,518,922 | 5/1985 | Luecke | 329/302 |
| 5,309,480 | 5/1994 | Powell, II et al. | 329/302 |

*Primary Examiner*—Siegried H. Grimm
*Attorney, Agent, or Firm*—Christie, Parker & Hale, LLP

[57] ABSTRACT

A demodulating system for estimating frequency offset and sampling time error by a Fast Fourier Transform operation, which receives a modulated signal sent from a GMSK (Gaussian Low-Pass Filtered Minimum Shift Keying) or a MSK (Minimum Shift Keying) transmitter and demodulates the signal. The demodulating system uses a Fast Fourier Transform converter to obtain frequency offset and sampling time error by applying to it an initial demodulated result generated from a discriminator or a phase differentiator.

17 Claims, 3 Drawing Sheets

DEMODULATING SYSTEM FOR MSK AND GMSK SIGNAL USING A FAST FOURIER TRANSFORM CONVERTER

FIELD OF THE INVENTION

The present invention relates to a demodulating system, and more specifically, to a demodulating system applying Fast Fourier Transform for estimating frequency offset and sampling time error.

BACKGROUND OF THE INVENTION

In a radio communication system, problems of frequency offset and sampling time error between the transmitter and the receiver usually occur, which degrade the performance of the system. Not only the frequency discrepancy between the oscillators of the transmitter and the receiver but also the Doppler effect will result in frequency offset. To non-coherently demodulate the modulated signal sent from the transmitter and avoid degrading the performance of the communication system, one still needs to obtain the correct frequency offset and sampling time error from the signals and respectively let the frequency offset and the sampling time error be compensated and modified. And when the receiver samples the modulated signals, a preferred sampling time is prerequisite for obtaining correct demodulated signals.

Further, due to the fact that the radio data are often transmitted in a burst mode, one may try to find a fast and stable method to estimate the mentioned frequency offset and sampling time error and then modify or compensate the frequency offset of the system in order to maintain the system performance.

A paper of Ralf Mehlan et al. titled "A Fully Digital Feedforward MSK Demodulator with Joint Frequency Offset and Symbol Timing Estimation for Burst Mode Mobile Radio", IEEE Transactions on Vehicular Technology, Vol. VT-42, No. 4, November 1993, pp. 434–443 discloses that a demodulating system for demodulating the signals sent from an MSK transmitter is to delay the received signal, multiply the delayed signal with the received signal, square the mentioned multiplication, and then obtain the sampling time error and the frequency offset by using several sets of filters. To achieve an optimal receiving performance, the system requires at least four sets of filters of length 64, which makes the implementation of the demodulating system uneconomical.

The Gaussian Low-Pass Filtered Minimum Shift Keying transmitter (also named GMSK) is now widely applied by many personal and mobile communicating system standards, which includes a Gaussian Low-Pass filter and a Frequency Modulator (FM modulator). If the GMSK transmitter is without the Gaussian Low-Pass filter, then it becomes a Minimum Shift Keying transmitter (MSK transmitter). But, a structure of the GMSK demodulating system using Fast Fourier Transform operation for estimating frequency offset and sampling error has heretofore not been used.

SUMMARY OF THE INVENTION

An objective of the present invention is to provide a demodulating system applying the Fast Fourier Transform operation for estimating frequency offset and sampling time error in order to simplify the structure of a receiving system, quickly accomplish the demodulation of a signal and/or have a practical receiving system suitable to be applied in an integrated circuit.

In accordance with the present invention, a demodulating system comprises a frequency converter receiving a modulated signal and converting the modulated signal into orthogonal signals X(t) and Y(t) of a baseband frequency, a pair of samplers electrically connected to the descending frequency converter for respectively sampling the X(t) and Y(t) signals, a frequency demodulator electrically connected to the pair of samplers for discriminating frequencies of signals outputted from the pair of samplers in order to obtain a preliminary demodulated signal f(n), a Fast Fourier Transform (FFT) converter electrically connected to the demodulator for processing the demodulated signal f(n) in order to calculate a frequency offset and a sampling time error, a sampling discriminator electrically connected to the Fast Fourier Transform converter for receiving the sampling time error in order to obtain preferred sampled values of the f(n) signal, a state discriminator electrically connected to the sampling discriminator and from the Fast Fourier Transform converter obtaining a level value to be compared with the sampled values outputted from the sampling discriminator to determine digital states of the sampled f(n) signal so as to accomplish a demodulation of the modulated signal, and a digital/analog converter electrically connected to and receiving the frequency offset from the Fast Fourier Transform converter for converting the frequency offset into an analog signal to be sent to the frequency converter in order to compensate for a frequency offset caused by the frequency converter to the modulated signal.

In accordance with the present invention, the demodulating system further comprises a low pass filter electrically connected between the frequency demodulator and the Fast Fourier Transform converter for filtering stray signals of the demodulated signal f(n) outputted from the frequency demodulator.

In accordance with the present invention, the frequency converter further comprises a multiplexer receiving the modulated signal and converting the modulated signal into two primary orthogonal signals, an oscillator providing a local oscillating signal, a pair of multipliers electrically connected to the multiplexer, wherein the two primary orthogonal signals are respectively multiplied by the oscillating signal to then generate the orthogonal signals X(t) and Y(t) of the baseband frequency, a phase-shifter electrically connected to one of the multiplier and the oscillator for causing to the local oscillating signal with a phase shift of $\pi/2$, and a pair of low-pass filters respectively connected to the pair of multipliers for filtering stray signals of the signals X(t) and Y(t).

In accordance with the present invention, the modulated signal is transmitted by a Gaussian Low-Pass filtered Minimum Shift Keying (GMSK) transmitter.

In accordance with the present invention, the modulated signal is transmitted by a Minimum Shift Keying (MSK) transmitter.

In accordance with the present invention, the Fast Fourier Transform converter calculates two converted Fast Discrete Fourier Transform values F(0) and F(L) outputted from the demodulator to obtain the frequency offset and the sampling time error, wherein the F(0) is the first value of the signal f(n) after a Fast Discrete Fourier Transform procedure executed by the FFT converter and the F(L) is the L'th value of f(n) after the Fast Discrete Fourier Transform procedure where L is a positive integer.

In accordance with the present invention, the frequency offset $$\Delta f = \frac{F[0]}{2\pi N},$$

where N is a sampling number of the Fast Fourier Transform converter; and the sampling time error $$m = -\left[\frac{T_b/T_s}{\pi}\right]\angle F[L],$$

where $T_b$ is a half period of the outputted signal from the frequency demodulator, $T_s$ is a sampling period of the samplers, and $$\angle F[L]$$

is a phase of the F[L].

In accordance with the present invention, the pair of samplers are a pair of analog/digital converters.

In accordance with another aspect of the present invention, a demodulating system adapted to be used with a transmitter receiving a data signal to be modulated into a modulated signal comprises a frequency converter receiving the modulated signal and converting the modulated signal into orthogonal signals X(t) and Y(t) of a baseband frequency, a pair of samplers electrically connected to the frequency converter for respectively sampling the X(t) and Y(t) signals in order to obtain sampled signals $X_{k,i}$ and $Y_{k,i}$, a phase differentiator electrically connected to the pair of samplers for receiving a phase difference $d_{k,i}$ between two successive outputted signals of each of the pair of samplers, a Fast Fourier Transform (FFT) converter electrically connected to the phase differentiator for receiving and processing the phase value $d_{k,i}$ in order to accordingly obtain a frequency offset and a sampling time error, a digital/analog converter electrically connected to and receiving the frequency offset from the Fast Fourier Transform converter for converting the frequency offset into an analog signal to be sent to the frequency converter in order to compensate for a frequency offset caused by the frequency converter to the modulated signal, a pair of sampling discriminators electrically connected to the Fast Fourier Transform converter for receiving the sampling error so as to respectively obtain preferred sampling values $X_{k,i}^*$ and $Y_{k,i}^*$ of the $X_{k,i}$ and the signals $Y_{k,i}$, a phase calculator electrically connected to the pair of sampling discriminators for calculating phases ψk of the values $X_{k,i}$ and $Y_{k,i}$, and a phase detector electrically connected to the phase calculator for detecting a representative bit of the modulated signal so as to accomplish a demodulation of the modulated signal.

In accordance with another aspect of the present invention, the demodulating system further comprises a comparator electrically connected to the phase differentiator, receiving the phase difference $d_{k,i}$ outputted from the phase differentiator and obtaining the smallest value of the phase difference $d_{k,i}$ corresponding to the preferred sampling and hence obtaining the sampling time error, and a switch electrically connected to the comparator and the pair of sampling discriminators for choosing for the phase discriminators one of the sampling time errors respectively obtained by the comparator and the Fast Fourier Transform converter in order to obtain the preferred sampling values $X_{k,i}^*$ and $Y_{k,i}^*$.

In accordance with another aspect of the present invention, the frequency offset calculated by the Fast Fourier Transform converter can be sent to the phase detector in order to compensate for the frequency offset.

In accordance with another aspect of the present invention, the frequency converter further comprises a multiplexer receiving the modulated signal and converting the modulated signal into two primary orthogonal signals, an oscillator providing an oscillating signal, a pair of multipliers electrically connected to the multiplexer, wherein the two orthogonal signals are respectively multiplied by the oscillating signal to then generate the orthogonal signals X(t) and Y(t) of the baseband frequency, a phase-shifter electrically connected to one of the multipliers and the oscillator for causing the local oscillating signal to have a phase shift of π/2, and a pair of low-pass filters respectively electrically connected to the pair of multipliers for filtering stray signals of the signals X(t) and Y(t).

In accordance with another aspect of the present invention, the Fast Fourier Transform converter obtains the frequency offset $$\Delta f = \frac{D[0]}{2\pi N'}, \text{ and}$$

the sampling time error $$m = -\left[\frac{T_b/T_s}{\pi}\right]\angle D[L],$$

where D[0] is a first value of $d_{k,i}/T_b/N$ after a Fast Discrete Fourier Transform procedure executed by the FFT converter, N' is a sampling number of the Fast Fourier Transform converter, $T_b$ is a period of the digital signal, $T_s$ is a sampling period of the sampler, $$\angle D[L]$$

is a phase of the L'th value the $d_{k,i}/T_b/N$ after the Fast Discrete Fourier Transform procedure where L is a positive integer.

In accordance with another aspect of the present invention, the modulated signal is transmitted by a Gaussian Low-Pass filtered Minimum Shift Keying (GMSK) transmitter.

In accordance with another aspect of the present invention, the modulated signal is transmitted by a Minimum Shift Keying (MSK) transmitter.

In accordance with another aspect of the present invention, a demodulating system further comprises an averaging filter electrically connected to the phase calculator for receiving an output phase value from the phase calculator and outputting a phase value ẐK̂ corresponding to the output phase value, a subtractor electrically connected to the averaging filter for receiving the phase value ẐK̂, and a phase-shifter electrically connected to the subtractor and obtaining a phase shift θ caused by the demodulating system to the modulated signal by subtracting π/4 by the phase value ẐK̂.

In accordance with another aspect of the present invention, the phase shift θ is provided to a coherent demodulator.

The present invention may best be understood through the following description with reference to the accompanying drawings, in which:

DETAILED DESCRIPTION OF THE PREFERRED EMBODIMENT

Figure 1:
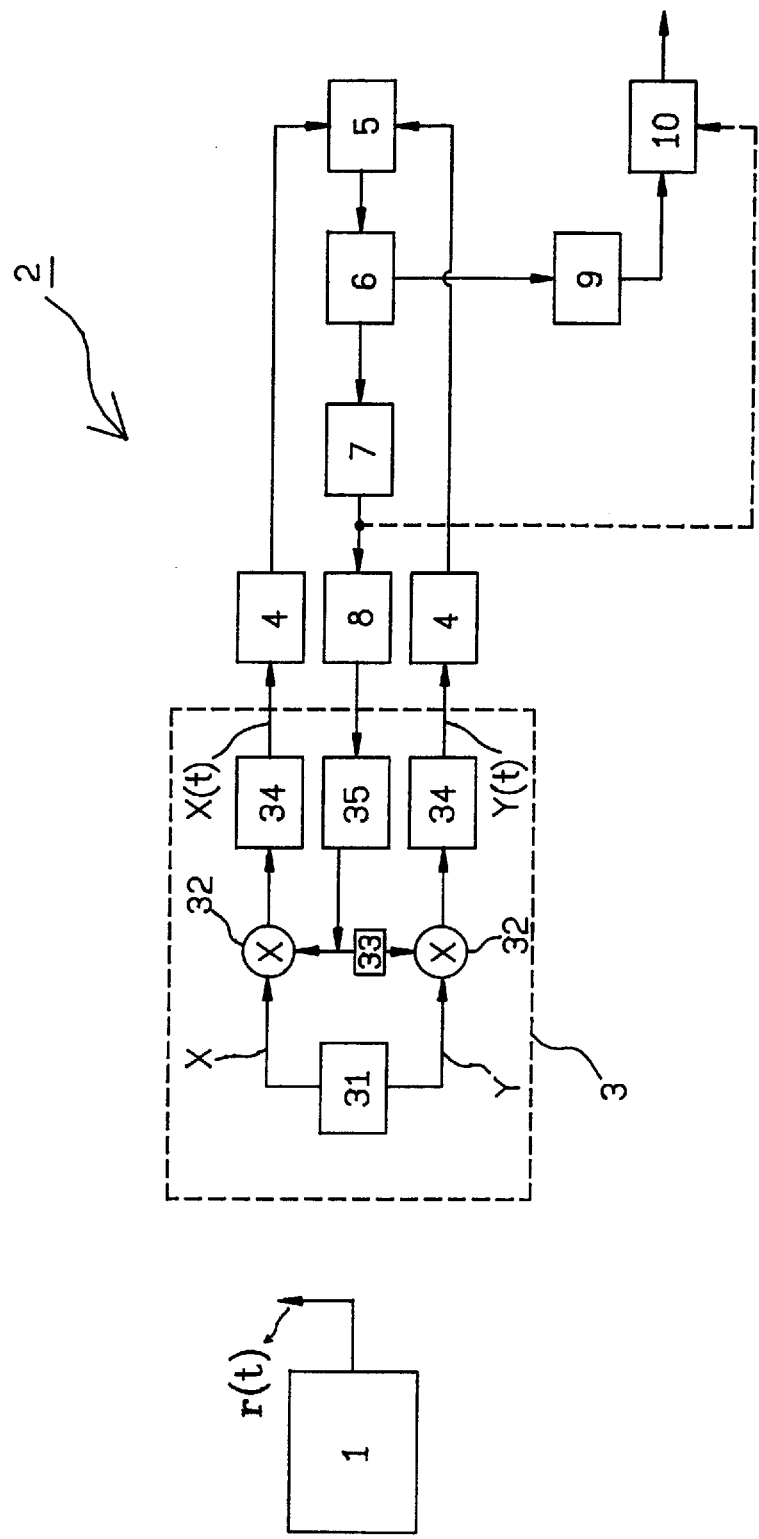
FIG. 1 schematically shows a preferred embodiment of a demodulating system of the present invention.

FIG. 1, shows a Gaussian Low-Pass Filtered Minimum Shift Keying (GMSK) transmitter 1 and a receiving system 2 of the present invention. The receiving system includes a frequency converter 3, a pair of samplers 4, a demodulator 5, a low-pass filter 6, a Fast Fourier Transform converter 7, a digital/analog converter 8, a sampling discriminator 9 and a state discriminator 10. The frequency converter 3 further comprises a multiplexer 31, a pair of multipliers 32, a phase-shifter 33, a pair of low-pass filters 34 and an oscillator 35.

The GMSK transmitter 1 receives a digital signal, modulates the digital signal and transmits the modulated signal r(t) to a receiving system 2 according to the present invention in order to accomplish the demodulation of the modulated signal r(t). Originally, the modulated signal r(t) is received by a multiplexer 31 and then is converted into X- and Y-component signals which through a multiplier 32 are respectively multiplied by a local oscillating signal provided by an oscillator 35, wherein the local oscillating signal was first shifted a phase π/2 through a phase-shifter 33 and then multiplied with the Y-component signal. A low-pass filter 34 is applied for filtering the stray signals of the resulting signal in order to obtain orthogonal signals X(t) and Y(t) of a baseband frequency corresponding to the modulated signal. For example, suppose the modulated signal $$r(t) = \cos(2\pi f_c t + \phi(t))$$

where $\phi(t)$ carries all the information and $f_c$ is a carrier frequency of the modulated signal, then $$X(t) = \cos(2\pi \Delta f t + \phi(t) - \theta) \quad (1)$$

$$Y(t) = \sin(2\pi \Delta f t + \phi(t) - \theta) \quad (2)$$

where $\Delta f$ is a frequency offset of an oscillator located between the transmitter 1 and the receiver 2 and $\theta$ is a phase shift between the transmitter 1 and the receiver 2.

Under an ideal situation, the output of the demodulator 5 is $$f(t) = \frac{x(t)y'(t) - y(t)x'(t)}{x^2(t) + y^2(t)} = 2\pi\Delta f + \phi'(t) \quad (3)$$

Figure 2:
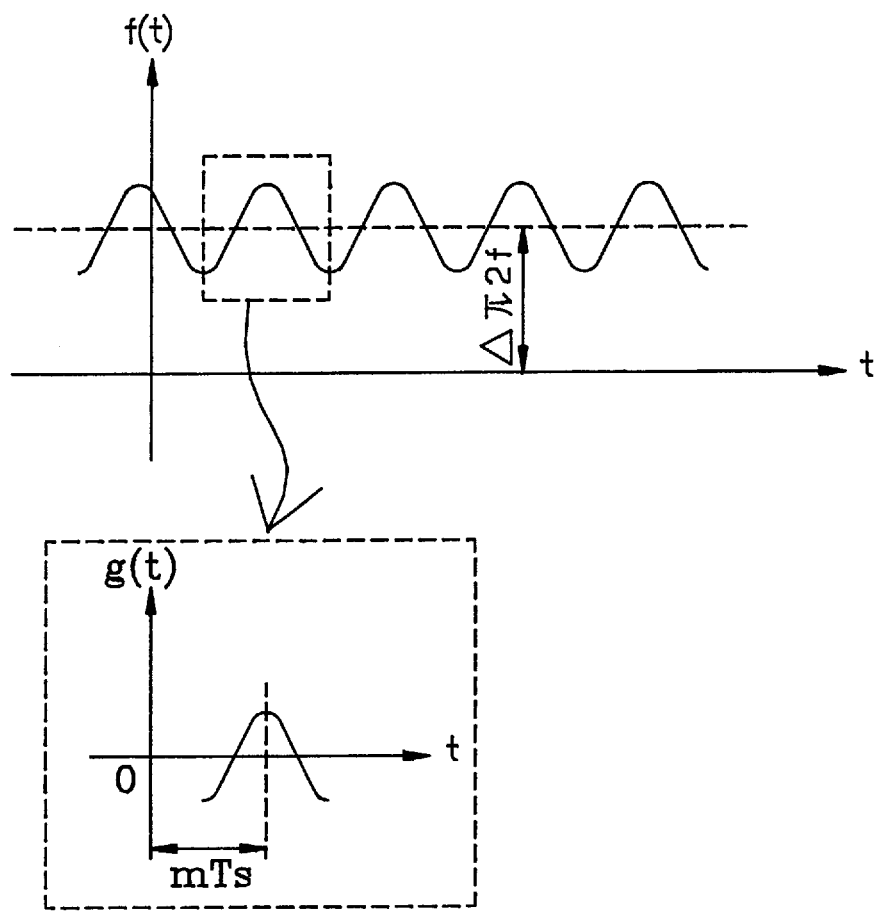
FIG. 2 is an output wave profile of a demodulator of the preferred embodiment shown in FIG. 1 according to the present invention.

If the modulated signal is a training series, e.g., 010101 . . . , then the output of the demodulator 5 is a periodical signal f(t) with a period of $2T_b$. An example of the wave profile is shown in FIG. 2, which includes a direct current term $2\pi\Delta f$ and a periodical wave profile $$\sum_L g(t - 1 \cdot 2T_b),$$

wherein $2T_b$ is the period of the signal, L is a positive integer and 2L is the bit number of the training series and g(t) is a wave profile having a length of $2T_b$. From FIG. 2, the f(t) can be shown as $$f(t) = 2\pi\Delta f + \sum_{l=0}^{L-1} g[n - 1 \cdot 2T_b] \quad (4)$$

If the sampler 4 samples f(t) at a speed of $1/T_s$, then the sampling series will be $$f(n) = f(nT_s) = 2\pi\Delta f + \sum_{l=0}^{L-1} g\left[n - 1 \cdot \frac{2T_b}{T_s}\right] \quad (5)$$

where g[n] represents the sampling series $g(nT_s)$ and f(n) has a period $2T_b/T_s$.

Define N points of Fast Discrete Fourier Transform (DFT) as $$F[K] = \sum_{n=0}^{N-1} f[n] e^{-j\frac{2\pi k}{N} n} \quad (6)$$

Letting $N = L(2T_b/T_s)$ and substituting equation (5) into equation (6), we obtain $$\begin{aligned}
F[K] &= 2\pi\Delta f \sum_{n=0}^{N-1} e^{-j\frac{2\pi k}{N} n} + \sum_{n=0}^{N-1} \left\{ \sum_{l=0}^{L-1} g\left[n - 1 \cdot \frac{2T_b}{T_s}\right] \right\} e^{-j\frac{2\pi k}{N} n} \\
&= 2\pi\Delta f \cdot N\delta[k] + \sum_{l=0}^{L-1} \left\{ \sum_{n=0}^{N-1} g\left[n - 1 \cdot \frac{2T_b}{T_s}\right] e^{-j\frac{2\pi k}{N} n} \right\} \\
&= 2\pi\Delta f \cdot N\delta[k] + \sum_{l=0}^{L-1} G[k] e^{-j\frac{2\pi k}{N} \cdot l \frac{2T_b}{T_s}} \\
&= 2\pi\Delta f \cdot N\delta[k] + G[k] \sum_{l=0}^{L-1} e^{-j\frac{2\pi k}{N} \cdot l}
\end{aligned} \quad (7)$$

where $\delta[k] = \begin{cases} 1, k = 0 \\ 0, k \neq 0 \end{cases}$

G[K] is the Fast Discrete Fourier Transform of g[n]. And we use the time shifting property of DFT, with DFT{g[n−r]}=G[K] $e^{-j2\pi k/Nr}$, where r is an integer. Thus, we can prove that $$\sum_{l=0}^{L-1} e^{-j\frac{2\pi k}{L}l} = \begin{cases} L, K = 0, L, 2L, 3L, \ldots \\ 0, \text{others}. \end{cases}$$

If $g(t)$ is symmetric on $t=m\,T_s$ (i.e., $g[n]$ is symmetric when $n=m$) and its direct current is zero as shown in FIG. 2, then $G[0]=0$ and $G[K]$ will have a linear phase $$\angle G[K] = -\left(\frac{2\pi m}{N}\right)K,$$

which can be known from the theory of DFT that if we let $K=0$, then equation (7) becomes $$F[0]=2\pi\Delta f N. \tag{8}$$

If we let $K=L$ and equation (7) becomes $$\begin{aligned} F[L] &= L \cdot |G[L]|e^{-j\frac{2\pi m}{N}L} \\ &= L \cdot |G[L]|e^{-j\frac{\pi m}{T_b/TS}}, \end{aligned} \tag{9}$$

then one can respectively estimate the frequency offset $\Delta f$ from equation (8) and the sampling error m from equation (9) as long as the $G[K]$ will not disappear when $K=L$. From equation (8), $$\Delta f = \frac{F[0]}{2\pi N} \tag{10}$$

where $F[0]$ is a first value of $f(t)$ after operated with a Fast Discrete Fourier Transform and N is the sample number of the Fast Fourier Transform converter 7. From equation (9), $$m = -\frac{T_b/T_s}{2\pi N}\angle F[L] \tag{11}$$

where $T_b$ is a half period of the signal $f(n)$ outputted from the demodulator 5 and is a period of the digital signal received by the transmitter 1, $T_s$ is the sampling period of the sampler 4, and $\angle F[L]$ is a phase of $F[L]$.

Judging from equation (8), (9), (10) and (11), if the $F[0]$ and $F[L]$ can be calculated, then the frequency offset $\Delta f$ and the sampling time error m can also be obtained. That is, the receiver 2 of the present invention can swiftly obtain $\Delta f$ and m by Fast Fourier Transform operations due to the previous derivation of the equations, since the application of FFT for obtaining $\Delta f$ and m requires only the $F[0]$ and $F[L]$ and needs not calculate all the converted FFT numbers outputted from the sampler 4.

After obtaining $\Delta f$ and m, $\Delta f$ can be sent to the oscillator 35 for frequency offset compensation after $\Delta f$ is converted to an analog signal through the digital/analog converter 8. After period several cycles of frequency offset compensation, the frequency offset can be adjusted to be 0. If the frequency offset value $\Delta f$ is returned to the oscillator 35, it is called a feedback type. Certainly, $\Delta f$ can also be sent to the state discriminator 10 for frequency compensation as shown by the dotted line in FIG. 1, which is called a feedforward type.

The sampler 9 receives m so as to obtain a preferred sampling value which is then sent to the state discriminator 10 for being compared with a level value in the state discriminator 10 in order to obtain an original information of the modulated signal and accomplish the demodulation of the modulated signal.

Figure 3:
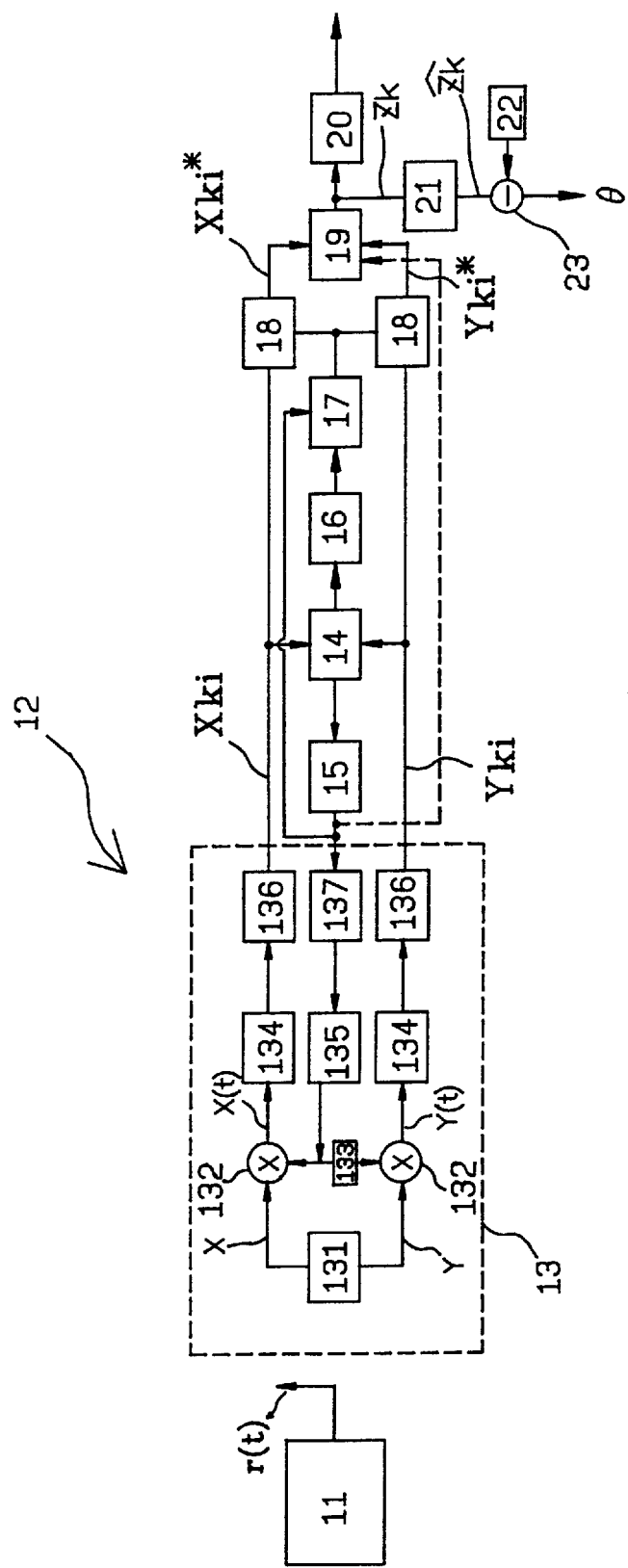
FIG. 3 schematically shows another preferred embodiment of a demodulating system according to the present invention.

Referring to FIG. 3, according to another preferred embodiment of the present invention, a receiving system 12 includes a frequency converter 13, a phase differentiator 14, a Fast Fourier Transform converter 15, a comparator 16, a switch 17, a pair of sampling discriminators 18, a phase calculator 19 and a phase detector 20. FIG. 3 also shows an averaging filter 21, a phase-shifter 22 and a subtractor 23. The output ZK of phase calculator 19 can be sent to the averaging filter 21 whose output ẐK̂ is subtracted from a phase value π/4 by the phase-shifter 22 through the subtractor 23 in order to obtain a phase shift θ for the application of a coherent demodulator.

The same as shown in FIG. 1, the modulator signal $r(t)$ is converted into orthogonal signals $X(t)$ and $Y(t)$ of a baseband frequency through the frequency converter 13. After being filtered off the stray signals thereof by a low-pass filter 134, the respective outputs $X_{k,i}$ and $Y_{k,i}$ of $X(t)$ and $Y(t)$ sampled through a sampler 136 are obtained, wherein $$X_{k,i}=\cos\{2\pi\Delta f(k+i/N)T_b+\phi(kT_b+i/NT_b-\epsilon T_b)-\theta\}, \tag{12}$$

$$Y_{k,i}=\sin\{2\pi\Delta f(k+i/N)T_b+\phi(kT_b+i/NT_b-\epsilon T_b)-\theta\}. \tag{13}$$

In the currently preferred embodiment, the sampler 136 samples $X(t)$ and $Y(t)$ (equations (1) and (2)) at a speed of $N/T_b$. K is the K'th sampling signal within the range $1\leq K\leq L$, L is a positive integer, i is the i'th sample of the sampler 136 within the range $0\leq i\leq N-1$ and $\epsilon$ is the signal sampling uncertainty of the sampler 136. Dividing (13) by (12), we obtain $$\frac{Y_{k,i}}{X_{k,i}} = \tan\left\{2\pi\Delta f\left(k+\frac{i}{N}\right)T_b+\phi\left(kT_b+\frac{i}{N}T_b-\epsilon T_b\right)-\theta\right\} \tag{14}$$

$$\tan^{-1}\frac{Y_{k,i}}{X_{k,i}} = \left\{2\pi\Delta f\left(k+\frac{i}{N}\right)T_b+\phi\left(kT_b+\frac{i}{N}T_b-\epsilon T_b\right)-\theta\right\}.$$

To estimate the frequency offset $\Delta f$, let the output of the phase differentiator 14 be $d_{k,i}$, i.e., the phase difference between the successive output signals $(X_{k,i}, Y_{k,i})$ and $(X_{k,i-1}, Y_{k,i-1})$ is $$d_{k,i} = \tan^{-1}\frac{Y_{k,i}}{X_{k,i}} - \tan^{-1}\frac{Y_{k,i-1}}{X_{k,i-1}} \quad (15)$$

$$= \left\{ 2\pi\Delta f\left(k+\frac{i}{N}\right)T_b + \phi\left(kT_b+\frac{i}{N}T_b-\epsilon T_b\right) - \theta \right\} -$$

$$\left\{ 2\pi\Delta f\left(k+\frac{i-1}{N}\right)T_b - \phi\left(kT_b+\frac{i-1}{N}T_b-\epsilon T_b\right) + \theta \right\}$$

$$= 2\pi\Delta f\frac{T_b}{N} + \phi\left(kT_b+\frac{i}{N}T_b-\epsilon T_b\right) - \phi\left(kT_b+\frac{i-1}{N}T_b-\epsilon T_b\right),$$

$$\frac{d_{k,i}}{T_b/N} = 2\pi\Delta f + \frac{N}{T_b}\left\{ \phi\left(kT_b+\frac{i}{N}T_b-\epsilon T_b\right) - \phi\left(kT_b+\frac{i-1}{N}T_b-\epsilon T_b\right) \right\}. \quad (16)$$

If the training series is still 010101 . . . , then $N/T_b\{\phi(kT_b+i/N\,T_b-\epsilon T_b)-\phi(kT_b+i-1/NT_b-\epsilon T_b)\}$ is an alternating current signal and $2\pi\Delta f$ is a direct current signal. Let the Fast Fourier Transform converter 15 execute Fast Discrete Fourier Transform for N' points of $d_{k,i}/T_b/N$ to obtain a function D[k] and receive the respective direct component D[0], then $$D[0] = 2\pi\Delta fN' + 0 \quad (17)$$
$$= 2\pi\Delta fN'$$

$$\Delta f = \frac{D[0]}{2\pi N'},$$

where $D[0]=d_{k,i}/T_b/N'$ is the first value after the process of Fast Discrete Fourier Transform, N' is the sampling number of Fast Fourier Transform taken by the Fast Fourier Transform converter 15.

The outputs $\tan^{-1} Y_{k,i}/X_{k,i}$ and $\tan^{-1} Y_{k,i-1}/X_{k,i-1}$ of the phase differentiator 14 can be first obtained by checking the table in order to easily calculate the $d_{k,i}$.

We can estimate the sampling error m by Fast Fourier Transform operation. Comparing equations (3) and (16), one may see that they are equivalent and the theory of finding the sampling error m by Fast Fourier Transform operation is still applicable here, wherein $$m = -\left[\frac{T_b/T_s}{\pi}\right] \angle D[L] \quad (18)$$

where $T_b$ is the data period of the data signal received by the transmitter 11, $T_s$ is the sampling period of the sampler 136, $\angle D[L]$ is the L'th phase value of $d_{k,i}/T_b/N$ after the process of Fast Fourier Transform.

The same as in the first preferred embodiment, the $\Delta f$ obtained by the Fast Fourier Transform converter 15 can either be sent to the oscillator 135 or to the phase detector 20 for frequency offset compensation. After m is sent to the sampling discriminator 18 which outputs preferred sampling values $X_{k,i}^*$ and $Y_{k,i}^*$ to the phase calculator 19 for calculating the phase value ZK. Phase value ZK is sent to the phase detector 20 for obtaining the original information of the modulated signal according to the phase detecting method so as to accomplish the demodulating process.

In the second preferred embodiment of the present invention, a comparator 16 and a switch 17 are provided for otherwise obtaining sampling time error value m. According to the phase shift of an ordinary GMSK demodulated signal in a training series, if the comparator 16 is used to obtain the minimum $d_{k,1}$, then by $$\min\{|d_{k,1}|, |d_{k,2}|, \ldots |d_{k,N}|\}=|d_{k,i}^*|\rightarrow i^* \quad (19)$$

we can obtain the preferred signal sampling point $i^*$ so as to make the $\epsilon$ minimum.

The switch 17 can choose either the Fast Fourier Transform converter 15 or the comparator 16 to calculate the m.

Further, in the second preferred embodiment, we can provide a method for finding the phase shift $\theta$ for use by the coherent demodulator. If the output ZK of the phase calculator 19 is taken as $$ZK = \tan^{-1}\frac{Y_{k,i}^*}{X_{k,i}^*} \quad (20)$$

$$= 2\pi\Delta f\left(k+\frac{i^*}{N}\right)T_b + \psi\left(kT_b+\frac{i^*}{N}T_b-\epsilon T_b\right) - \theta$$

and is inputted to the averaging filter 21, then the output of the averaging filter 21 will be $$\hat{Z}\hat{K}=\pi/4+\text{(a phase variation due to the phase shift)}-\theta. \quad (21)$$

From $\Delta f$ of equation (17), when $\Delta f$ is fed back to the oscillator 135 for frequency offset compensation cycles the $\Delta f$ approaches 0 so that $$\hat{Z}\hat{K}\approx\pi/4+0-\theta$$

$$\theta=\pi/4-\hat{Z}\hat{K} \quad (22).$$

Consequently, after subtracting $\hat{Z}\hat{K}$ from $\pi/4$ by the phase-shifter 22, the phase shift $\theta$ can be obtained for the application of a coherent demodulator.

From the described preferred embodiments, the present invention calculates the frequency offset $\Delta f$ and the sampling time error m by Fast Fourier Transform operation to simplify the structure of the present receiving system. Also, the Fast Fourier Transform is an advance method which does not have to calculate every converted value of the demodulated sampling values after the process of Fast Fourier Transform; instead, it only has to calculate F[0], F[L], D[0] and D[L] and can swiftly obtain $\Delta f$ and m. Further, the structure of the present invention is very regular, which is suitable to be applied in an integrated circuit to be commercially valuable.

Though the present invention is used in a non-coherent system, it still provides a method for finding the phase shift for the application of a coherent demodulator.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A demodulating system comprising:

a frequency converter receiving a modulated signal and converting said modulated signal into orthogonal signals X(t) and Y(t) of a baseband frequency;

a pair of samplers electrically connected to said descending frequency converter for respectively sampling said X(t) and Y(t) signals;

a frequency demodulator electrically connected to said pair of samplers for discriminating frequencies of signals outputted from said pair of samplers in order to obtain a preliminary demodulated signal f(n);

a Fast Fourier Transform (FFT) converter electrically connected to said demodulator for processing said demodulated signal f(n) in order to calculate a frequency offset and a sampling time error;

a sampling discriminator electrically connected to said Fast Fourier Transform converter for receiving said sampling error in order to obtain preferred sampled values of said f(n) signal;

a state discriminator electrically connected to said sampling discriminator and from the Fast Fourier Transform converter obtaining a level value to be compared with said sampled values outputted from said sampling discriminator to determine digital states of said sampled f(n) signal so as to accomplish a demodulation of said modulated signal; and a digital/analog converter electrically connected to and receiving said frequency offset from said Fast Fourier Transform converter for converting said frequency offset into an analog signal to be sent to said frequency converter in order to compensate for a frequency offset caused by said frequency converter to said modulated signal.

2. A demodulating system according to claim 1, further comprising a low pass filter electrically connected between said frequency demodulator and said Fast Fourier Transform converter for filtering stray signals of said demodulated signal f(n) outputted from said frequency demodulator.

3. A demodulating system according to claim 2, wherein said frequency converter further includes:

a multiplexer receiving said modulated signal and converting said modulated signal into two primary orthogonal signals;

an oscillator providing a local oscillating signal;

a pair of multipliers electrically connected to said multiplexer, wherein said two primary orthogonal signals are respectively multiplied by said oscillating signal to generate said orthogonal signals X(t) and Y(t) of said baseband frequency;

a phase-shifter electrically connected to one of said multipliers and said oscillator for causing in said local oscillating signal a phase shift of $\pi/2$; and a pair of low-pass filters respectively connected to said pair of multipliers for filtering stray signals of said signals X(t) and Y(t).

4. A demodulating system according to claim 1, wherein said modulated signal is transmitted by a Gaussian Low-Pass Filtered Minimum Shift Keying (GMSK) transmitter.

5. A demodulating system according to claim 1, wherein said modulated signal is transmitted by a Minimum Shift Keying (MSK) transmitter.

6. A demodulating system according to claim 5, wherein said Fast Fourier Transform converter calculates two converted Fast Discrete Fourier Transform values F(0) and F(L) outputted from said demodulator to obtain said frequency offset and said sampling time error, wherein said F(0) is a first value of said signal f(n) after a Fast Discrete Fourier Transform procedure executed by said FFT converter and said F(L) is the L'th value of f(n) after said Fast Discrete Fourier Transform procedure where L is a positive integer.

7. A demodulating system according to claim 5, wherein said frequency offset $$\Delta f = \frac{F[0]}{2\pi N},$$

where N is a sampling number of said Fast Fourier Transform converter; and said sampling error $$m = -\left[\frac{T_b/T_s}{\pi}\right] \angle F[L],$$

where $T_b$ is a half period of said outputted signal from said frequency demodulator, $T_s$ is a sampling period of said samplers, and $\angle F[L]$ is a phase of said $F[L]$.

8. A demodulating system according to claim 1, wherein said pair of said samplers are a pair of analog/digital converters.

9. A demodulating system adapted to be used with a transmitter receiving a data signal to be modulated into a modulated signal comprising:

a frequency converter receiving said modulated signal and converting said modulated signal into orthogonal signals X(t) and Y(t) of a baseband frequency;

a pair of samplers electrically connected to said frequency converter for respectively sampling said X(t) and Y(t) signals in order to obtain sampled signals $X_{k,i}$ and $Y_{k,i}$;

a phase differentiator electrically connected to said pair of samplers for receiving a phase difference $d_{k,i}$ between two successive outputted signals of each of said pair of samplers;

a Fast Fourier Transform (FFT) converter electrically connected to said phase differentiator for receiving and processing said phase difference $d_{k,i}$ in order to accordingly obtain a frequency offset and a sampling error;

a digital/analog converter electrically connected to and receiving said frequency offset from said Fast Fourier Transform converter for converting said frequency offset into an analog signal to be sent to said frequency converter in order to compensate for a frequency offset caused by said frequency converter to said modulated signal;

a pair of sampling discriminators electrically connected to said Fast Fourier Transform converter for receiving said sampling error so as to respectively obtain preferred sampling values $X_{k,i}^*$ and $Y_{k,i}^*$ of said signals $X_{k,i}$ and $Y_{k,i}$;

a phase calculator electrically connected to said pair of sampling discriminators for calculating phases $\psi k$ of said values $X_{k,i}^*$ and $Y_{k,i}^*$; and a phase detector electrically connected to said phase calculator for detecting a representative bit of said modulated signal so as to accomplish a demodulation of said modulated signal.

10. A demodulating system according to claim 9, further comprising:

a comparator electrically connected to said phase differentiator, and receiving said phase difference $d_{k,i}$ outputted from said phase differentiator and obtaining the smallest value of said phase difference $d_{k,i}$ corresponding to said preferred sampling and hence obtaining the sampling time error; and a switch electrically connected to said comparator and said pair of sampling discriminators for choosing for said sampling discriminators one of said sampling time errors respectively obtained by said comparator and said Fast Fourier Transform converter so as to obtain said preferred sampling values $X_{k,i}^*$ and $Y_{k,i}^*$.

11. A demodulating system according to claim 9, wherein said frequency offset calculated by said Fast Fourier Transform converter can be sent to said phase detector in order to compensate for said frequency offset.

12. A demodulating system according to claim 11, wherein said frequency converter further comprises:

a multiplexer receiving said modulated signal and converting said modulated signal into two primary orthogonal signals;

an oscillator providing a local oscillating signal;

a pair of multipliers electrically connected to said multiplexer, wherein said two primary orthogonal signals are respectively multiplied by said oscillating signal to then generate said orthogonal signals X(t) and Y(t) of said baseband frequency;

a phase-shifter electrically connected to one of said multipliers and said oscillator for causing said local oscillating signal to have a phase shift of $\pi/2$; and a pair of low-pass filters respectively electrically connected to said pair of multipliers for filtering stray signals of said signals X(t) and Y(t).

13. A demodulating system according to claim 12, wherein said Fast Fourier Transform converter obtains said frequency offset $$\Delta f = \frac{D[0]}{2\pi N'}, \text{ and}$$

said sampling time error $$m = -\left[\frac{T_b/T_s}{\pi}\right] \angle D[L],$$

where D[0] is a first value of $d_{k,i}/T_b/N$ after a Fast Discrete Fourier Transform procedure executed by said FFT converter, N' is a sampling number of said Fast Fourier Transform converter, $T_b$ is a period of said digital signal, $T_s$ is a sampling period of said sampler, $\angle D[L]$ is a phase of the L'th value of $d_{k,i}/T_b/N$ after said Fast Discrete Fourier Transform procedure where L is a positive integer.

14. A demodulating system according to claim 9, wherein said modulated signal is transmitted by a Gaussian Low-Pass Filtered Minimum Shift Keying (GMSK) transmitter.

15. A demodulating system according to claim 9, wherein said modulated signal is transmitted by a Minimum Shift Keying (MSK) transmitter.

16. A demodulating system according to claim 9, further comprising:

an averaging filter electrically connected to said phase calculator for receiving an output phase value from said phase calculator and outputting a phase value $\hat{Z}\hat{K}$ corresponding to said output phase value;

a subtractor electrically connected to said averaging filter for receiving said phase value $\hat{Z}\hat{K}$; and a phase-shifter electrically connected to said subtractor and obtaining a phase shift θ caused by said demodulating system to said modulated signal by subtracting from $\pi/4$ said phase value $\hat{Z}\hat{K}$.

17. A demodulating system according to claim 16, wherein said phase shift θ is provided to a coherent demodulator.

* * * * *